(12) United States Patent  (10) Patent No.: US 6,874,398 B2
Binggeli  (45) Date of Patent: Apr. 5, 2005

(54) ASSEMBLY FOR CUTTING A TUBE

(75) Inventor: Rudolf Binggeli, Wohlen (CH)

(73) Assignee: Spiro SA, Boesingen (CH)

( * ) Notice: Subject to any disclaimer, the term of this patent is extended or adjusted under 35 U.S.C. 154(b) by 0 days.

(21) Appl. No.: 10/274,852

(22) Filed: Oct. 18, 2002

(65) Prior Publication Data

US 2004/0074359 A1 Apr. 22, 2004

(51) Int. Cl.$^7$ .............................. B23D 19/04; B26D 1/24
(52) U.S. Cl. ............................... 83/500; 83/184; 83/504
(58) Field of Search ......................... 83/500, 504, 178, 83/184

(56) References Cited

U.S. PATENT DOCUMENTS

| | | | |
|---|---|---|---|
| 1,753,827 A | 4/1930 | Glässer et al. | |
| 4,576,070 A | 3/1986 | Fitzgerald | 82/82 |
| 4,706,481 A | 11/1987 | Castricum | 72/49 |
| 4,827,816 A | 5/1989 | Takaniemi | 82/70.1 |
| 5,020,351 A | 6/1991 | Castricum | |
| 5,636,541 A | 6/1997 | Castricum | 72/49 |
| 5,720,095 A | 2/1998 | Lennartsson | 29/509 |
| 5,860,305 A | 1/1999 | Castricum | 72/49 |
| 5,865,083 A | * 2/1999 | Kania et al. | 83/504 X |
| 6,295,853 B1 | 10/2001 | Castricum | 72/49 |

FOREIGN PATENT DOCUMENTS

| | | |
|---|---|---|
| DE | 25 38 115 | 3/1977 |
| DE | 43 32 008 | 3/1995 |
| EP | 0 247 553 B1 | 12/1987 |
| EP | 0 247 553 A1 | 12/1987 |
| EP | 0 384 625 A1 | 8/1990 |
| EP | 0 499 915 A1 | 8/1992 |
| EP | 0 733 428 A1 | 9/1996 |
| EP | 0 749 787 A1 | 12/1996 |
| GB | 2 213 748 A | 8/1989 |

* cited by examiner

Primary Examiner—Charles Goodman
(74) Attorney, Agent, or Firm—Weingarten, Schurgin, Gagnebin & Lebovici LLP

(57) ABSTRACT

A tube cutting assembly has a pair of opposite, rotatable cutting wheels, the outer of which is movable into engagement with a rotatable tube for cutting through the tube wall. Each cutting wheel is provided with a peripheral elastic ring which is configured to engage the tube wall and which is compressible towards the opposite cutting wheel. As a result, undesirable deformations of the cut tube end are avoided.

16 Claims, 2 Drawing Sheets

ASSEMBLY FOR CUTTING A TUBE

FIELD OF THE INVENTION

The present invention relates to an assembly for cutting a rotatable tube, in particular a helically-wound lock-seam tube to be used in ventilation ductworks.

Such tube cutting assemblies are often included in machines for producing helically-wound lock-seam tubes. In these machines, a metal strip is helically wound into a tube in a forming head and locked in a helical lock seam. Basic examples of such machines or tube formers are shown in GB-A-2,213,748 (FIG. 1) and U.S. Pat. No. 4,706,481 (FIG. 15). The tube cutting assembly is mounted after the forming head.

BACKGROUND ART

Known tube cutting assemblies of this type, often referred to as slitters by people skilled in the art, normally comprise a pair of opposite rotatable cutting wheels which are brought into engagement with the tube wall and co-operate to cut or sever the rotating tube. A first cutting wheel is disposed inside the tube and a second cutting wheel is disposed outside the tube. When the tube is to be cut, the outer cutting wheel is brought into engagement with the outer surface of the tube and its cutting edge cuts through the tube wall against the cutting edge of the inner cutting wheel. An example of such a tube cutting assembly is disclosed in U.S. Pat. No. 5,636,541 and its counterpart EP-A-749,787 which is hereby incorporated by reference (see in particular FIGS. 13 and 14).

Under normal circumstances these known tube cutting assemblies work very well, but in certain cutting operations the end of the cut tube is deformed in an undesirable manner. This is illustrated in FIG. 1 which shows a cut tube seen from the end. Such undesirable deformations of the tube wall at the end sometimes occur on thin-walled tubes when the two cutting wheels are brought into engagement with the tube wall at high speed. The same difficulties may arise when the rotational speeds of the tube and the cutting wheels are not synchronized. The problem is particularly common when cutting helically-wound lock-seam tubes, since the helical lock seam causes "bumps" at the cutting location between the cutting wheels which in turn may lead to deformations of the end of the cut tube.

The deformations at the end of the cut tube make it hard to connect various tubular components to the tube which are inserted in the tube from the end. When mounting ventilation duct systems including helically-wound lock-seam tubes of sheet metal, fittings like bends, T pieces, reducers and other coupling members are connected to the ventilation ducts. If these fittings do not fit the ducts, the fitter either has to eliminate the end deformations manually or, if it comes to the worst, discard the duct as scrap.

SUMMARY OF THE INVENTION

The object of the invention is to provide a new tube cutting assembly which is improved over prior art and by means of which the problems above are eliminated or at least reduced.

This object is achieved by an assembly for cutting a tube which is rotatable about a center axis and which has a tube wall, comprising: a first cutting wheel located inside the tube and rotatable about an axis of rotation parallel with the center axis of the tube, the first cutting wheel having a peripheral cutting edge and a peripheral tube supporting surface to be engaged with the tube wall; a second cutting wheel located outside the tube and opposite the first cutting wheel, and rotatable about an axis of rotation parallel with the center axis of the tube, the second cutting wheel having a peripheral cutting edge and a peripheral tube supporting surface to be engaged with the tube wall; and means for bringing the cutting wheels into cutting engagement with the tube wall in a cutting direction perpendicular to the center axis of the tube for cutting through the tube wall at a cutting location; wherein that at least one of the cutting wheels has a peripheral elastic member which is configured to be engaged with the tube wall at the cutting location and which is compressible towards the tube supporting surface of the opposite cutting wheel.

Owing to the peripheral elastic member provided on at least one of the cutting wheels of the tube cutting assembly, the cutting operation is very smooth and no deformation occurs at the cut end of the tube. When the movable cutting wheel is brought into engagement with the tube at the cutting location, the peripheral elastic member is compressed and effectively damps the impact on the tube wall. Thus, the deforming forces that are exerted on the end of the tube being cut are reduced in comparison with prior-art tube cutters.

In a preferred embodiment, both cutting wheels have a peripheral elastic member for engagement with the tube wall at the cutting location. This embodiment provides for a symmetric cutting operation with a damping effect on both sides of the tube wall. The deforming forces are reduced on both sides.

Preferably, the peripheral elastic members are offset radially inside the cutting edge of the associated cutting wheel. As a result, the peripheral surface of each elastic member is supported by an opposite tube supporting surface of the opposite cutting wheel. This leads to a very smooth cutting operation that reduces the risk of deformations at the end of the cut tube.

Most preferably, each peripheral elastic member comprises an annular element which is fastened to the front surface of the associated cutting wheel. This design of the elastic members is advantageous since it is simple and provides a good damping effect.

In a preferred embodiment, the annular elastic element is clamped against the front surface of the associated cutting wheel by means of a clamping disc which is fastened to said front surface. This fastening technique is simple and has the specific advantage that it makes it easy to upgrade existing tube formers with an improved tube cutting assembly. Preferably, the clamping disc is fastened to said front surface by means of a central tightening screw which is coaxial with the rotational axis of the associated cutting wheel. This fastening of the annular elastic element is very secure and easy to handle.

In another aspect of the invention, the peripheral elastic member is mounted in a peripheral recess of the associated cutting wheel. By this design, a well-balanced damping effect is accomplished during the cutting operation. Peripheral surfaces of the cutting wheel on either side of the peripheral elastic member can support the tube wall at the cutting location, which makes cutting smooth.

In a preferred embodiment, the peripheral elastic member is an annular element with a peripheral surface which is disposed radially outside the cutting edge of the associated cutting wheel. This design provides for an initial damping of the cutting impact, which reduces the risk of deformations at the end of the cut tube. Most preferably, the annular elastic element of this embodiment is clamped in the peripheral recess by means of a clamping disc.

It is preferred that the peripheral elastic member be made of a polymer material.

BRIEF DESCRIPTION OF THE DRAWINGS

The invention and its advantages will be further described in the following, reference being had to the accompanying diagrammic drawings which by way of example illustrate presently preferred embodiments.

DETAILED DESCRIPTION OF PREFERRED EMBODIMENTS

Figure 1:
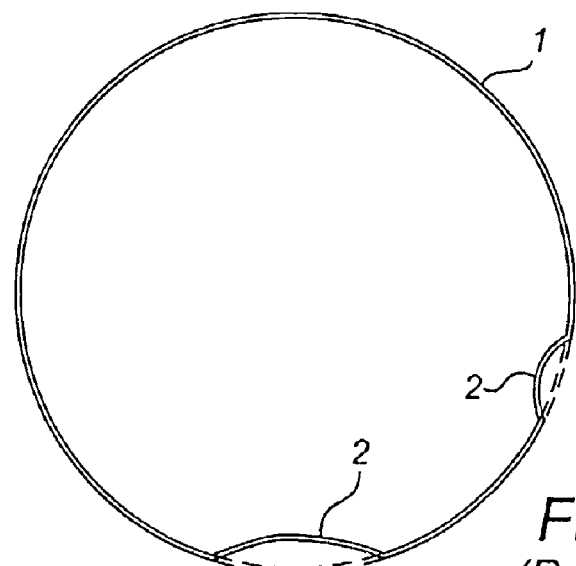
FIG. 1 is an end view of a tube cut with a prior-art tube cutter, the tube wall having undesirable deformations.

FIG. 1 shows a prior-art tube 1 of circular cross-section having undesirable deformations 2 at the cut end. The deformations 2 are shown as indentations inwards, but the prior-art cutting operation can also cause other types of deformations, such as small cuts or burrs.

Figure 2:
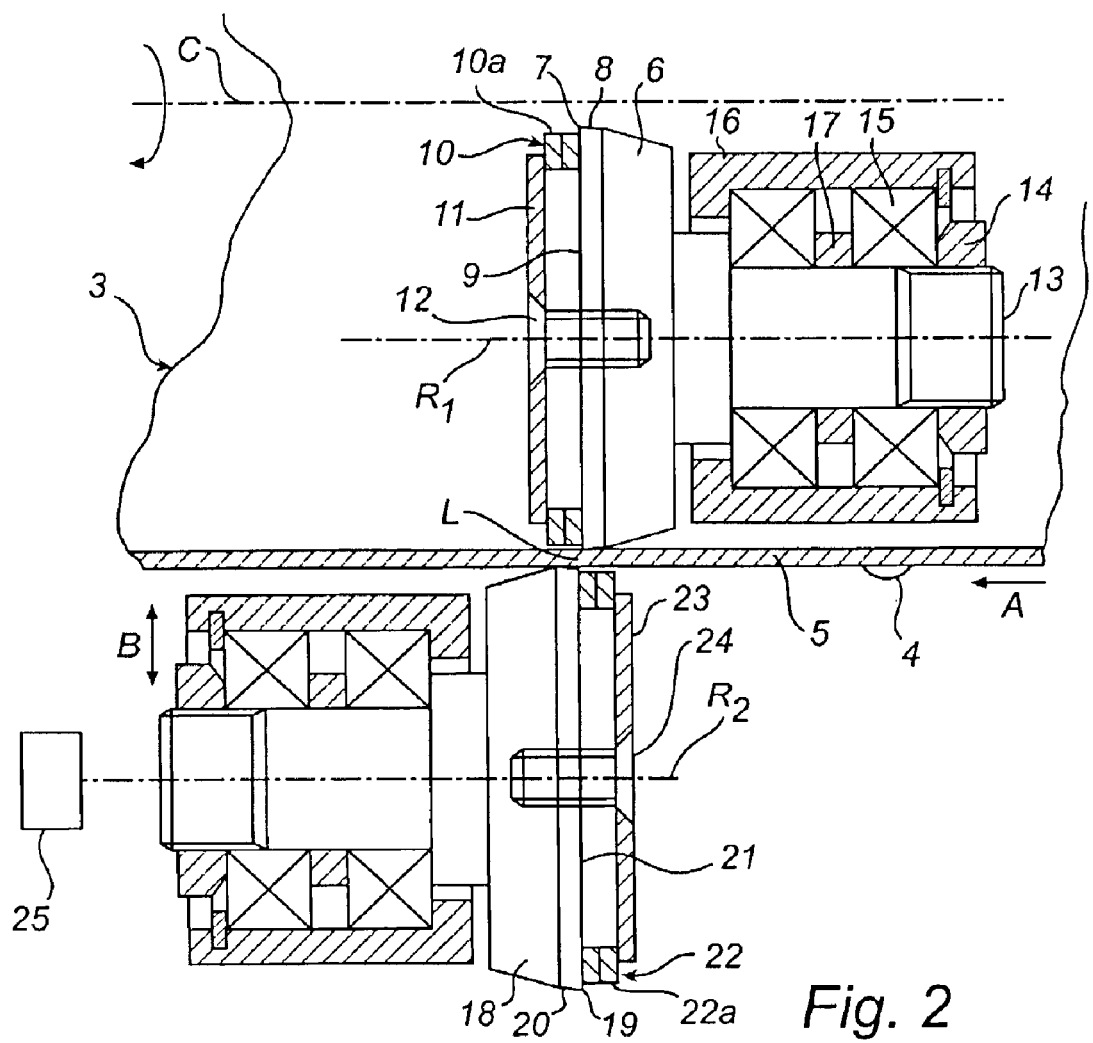
FIG. 2 is a sectional view of a tube cutting assembly according to a first aspect of the invention.

FIG. 2 shows a tube cutting assembly according to a first aspect of the invention. A tube in the shape of a helically-wound lock-seam tube 3 of sheet metal, produced in a tube former of the type discussed by way of introduction, is to be cut or severed by the tube cutting assembly. The tube 3 has a helical lock seam 4 which is shown schematically. The lock seam 4 projects outwards from the tube wall 5 which for instance has a wall thickness of 0.4–0.5 mm.

In a manner known per se, the tube 3 is rotated about a center axis C and moved in the direction of arrow A from a forming head (not shown).

The tube cutting assembly comprises a first cutting wheel 6 which is located inside the tube 3 and which is rotatable about an axis of rotation R1 parallel with the center axis C of the tube 3. The inner cutting wheel 6 is circular and has a peripheral cutting edge 7 and a peripheral tube supporting surface 8 to be engaged with the tube wall 5. On the front surface 9 of the inner cutting wheel 6 there is mounted a peripheral elastic member, here in the shape of an annular element or ring 10, preferably of polymer material. The elastic ring 10 is mounted by means of a circular clamping disc 11 which is fastened to the front surface 9 of the wheel 6 by means of a central tightening screw 12 which is coaxial with the rotational axis R1 of the wheel 6.

The components providing for the rotation of the inner cutting wheel 6 are known per se and will not be described in detail. For the sake of completeness, though, it should be mentioned that these components comprise a shaft 13 held by a nut 14 and journalled in bearings 15 included in a housing 16 and spaced by a spacer 17.

The tube cutting assembly further comprises an opposite second cutting wheel 18 which is located outside the tube 3 and which is rotatable about an axis of rotation R2 parallel with the center axis C of the tube 3. The outer cutting wheel 18 is circular and of the same design as the inner cutting wheel 6. Thus, the outer wheel 18 has a peripheral cutting edge 19, a peripheral tube supporting surface 20 and a front surface 21. An elastic ring 22, preferably of polymer material, is mounted on the front surface 21 by means of a circular clamping disc 23 fastened by a tightening screw 24 which is coaxial with the rotational axis $R_2$ of the outer wheel 18.

The components providing for the rotation of the outer wheel 18 are the same as for the inner wheel 6 and need not to be described in detail.

The outer cutting wheel 18 is movable in a direction perpendicular to the center axis C of the tube 3 for bringing the opposite cutting wheels 6 and 18 into cutting engagement at a cutting location L between the wheels 6, 18. Means 25 which provide this movement (arrow B) are of known type and are only shown schematically.

The operation of the tube cutting assembly according to this first aspect of the invention will now be described.

The tube 3 is rotated and moved in the direction of arrow A. When the tube 3 is to be cut or severed, the lower or outer cutting wheel 18, which is rotating, is raised and brought into engagement with the outer surface of the tube wall 5. The cutting edge 19 of the outer wheel 18 cuts through the tube wall 5 and, in doing this, the tube supporting surface 20 of the outer wheel 18 abuts the outer surface of the tube wall 5. During this cutting movement, the inner cutting wheel 6 (which is rotating but stationary with respect to the cutting direction B) supports and backs up the outer wheel 18. The cutting edge 7 of the inner cutting wheel 6 cuts through the tube wall 5 from the inside and the tube supporting surface 8 abuts the inner surface of the tube wall 5.

As the cutting operation proceeds, the respective cutting edges 7 and 19 as well as the respective tube supporting surfaces 8 and 20 abut the respective elastic rings 10 and 22 which are compressed. Owing to the compression of the elastic rings 10 and 22, the cutting of the tube 3 is very smooth and no "bumps" occur. The elastic rings 10 and 22 take up the transverse cutting forces and provide for a secure cutting of the tube 3 which is not deformed at the cut end.

Thus, the tube wall 5 is pressed between the peripheral surface 10a of the elastic ring 10 of the inner wheel 6 and the peripheral tube supporting surface 20 of the outer wheel 18. At the same time, the tube wall 5 is pressed between the peripheral surface 22a of the elastic ring 22 of the outer wheel 18 and the peripheral tube supporting surface 8 of the inner wheel 6.

Not even the lock seam 4 causes any difficulties when it passes the cutting location L, since the elastic rings 10 and 22 effectively compensate for the projecting lock seam 4. Consequently, the former problems with lock seams in prior-art tube cutters are eliminated. The lock seam 4 does not cause any "bump" between the cutting wheels 6, 18.

The elastic rings 10 and 22 are both offset radially inside the cutting edges 7 and 19 of the associated wheels 6 and 18. In other words, the peripheral surfaces 10a and 22a are disposed at a distance inwardly from the cutting edges 7 and 19. As a result, the cutting edges 7 and 19 can initiate the cutting through of the tube wall 5 before the elastic rings 10 and 22 are compressed in order to avoid undesirable deformations of the cut end of the tube 3. This leads to a very smooth cutting operation and a tube end of perfect circular cross-section.

Figure 3:
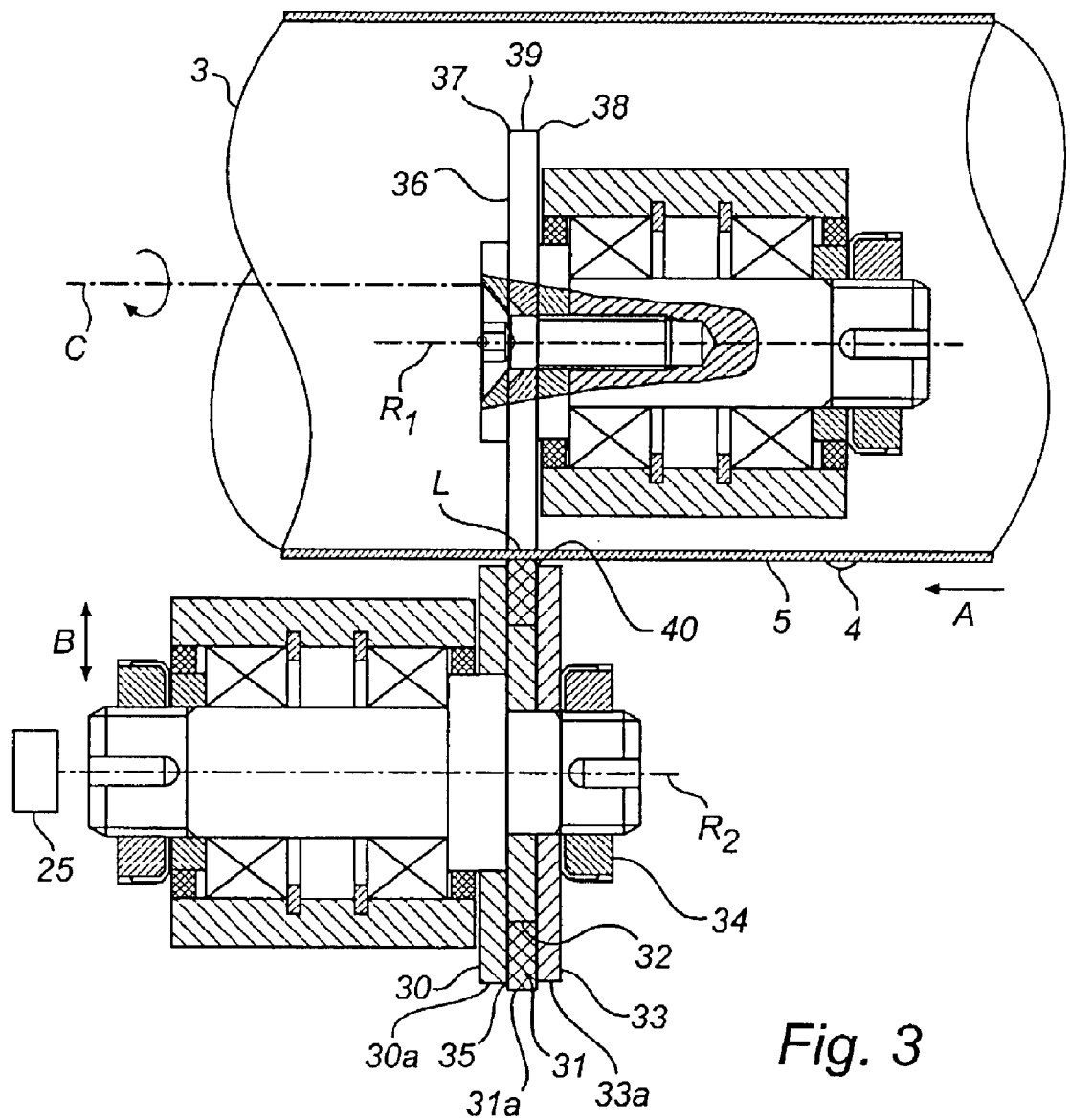
FIG. 3 is a sectional view of a tube cutting assembly according to a second aspect of the invention.

FIG. 3 shows a tube cutting assembly according to a second aspect of the invention. The basic idea behind this structure is the same as described above, but the design of the cutting wheels is somewhat different.

The outer cutting wheel 30 has a peripheral elastic member, here in the shape of an annular element or ring 31, preferably of polymer material, mounted in a peripheral recess 32 of the wheel 30. The elastic ring 31 is fastened in the recess 32 by means of a clamping disc 33 tightened by a screw 34 which is coaxial with the axis of rotation R2 of the outer wheel 30. The peripheral surface 31a of the elastic ring 31 is disposed radially outside the peripheral cutting edge 35 of the outer wheel 30, which means that the elastic ring 31 is first brought into engagement with the tube wall 5 in the cutting operation. Thus, the compression of the elastic ring 31 starts.

The inner cutting wheel 36 has no elastic member, but two peripheral cutting edges 37 and 38, between which there is a peripheral tube supporting surface 39. In operation, the outer wheel 30 is raised by means 25 (arrow B) and brought into engagement with the tube wall 5 at the cutting location L. The cutting edges 35, 37 and 38 co-operate to cut the tube 3, the elastic ring 31 being compressed by the tube supporting surface 39. It should be pointed out that the peripheral edge 40 of the clamping disc 33 close to the elastic ring 31 acts as a cutting edge during this compression. The tube 3 is cut at two points, leaving a "ring" of the tube 3 as scrap.

The peripheral surfaces 30a and 33a of the outer cutting wheel 30 and the clamping disc 33 serve as tube supporting or back-up surfaces for the tube wall 5, which enhances the cutting operation.

The components providing the rotation of the two wheels 30 and 36 are the same as in the first structure and need not be described in detail.

An advantage of the tube cutting assembly according to the invention is that it can either be supplied as an attachment to an existing tube former or be mounted on a new tube former.

Finally, it should be emphasized that the invention is by no means restricted to the embodiments described above, and modifications are feasible within the scope of the inventive concept as expressed in the appended claims. Either one of or both of the opposite cutting wheels may be provided with a peripheral elastic member to be compressed during the cutting operation. Furthermore, either one of or both of the cutting wheels can be movable in a direction transversely of the center axis of the tube, although it is preferred for the outer wheel to be movable.

What I claim and desire to secure by Letters Patent is:

1. An assembly for cutting a tube which is rotatable about a center axis and which has a tube wall, comprising:
    a first cutting wheel located inside the tube and rotatable about an axis of rotation parallel with the center axis of the tube, the first cutting wheel having a peripheral cutting edge and a peripheral tube supporting surface to be engaged with the tube wall;
    a second cutting wheel located outside the tube and opposite the first cutting wheel, and rotatable about an axis of rotation parallel with the center axis of the tube, the second cutting wheel having a peripheral cutting edge and a peripheral tube supporting surface to be engaged with the tube wall, and
    means for bringing the cutting wheels into cutting engagement with the tube wall in a cutting direction perpendicular to the center axis of the tube for cutting through the tube wall at a cutting location;
    wherein at least one of the cutting wheels has a peripheral elastic member which is configured to be engaged with the tube wall at the cutting location and which is compressible in a direction parallel with the cutting direction towards the tube supporting surface of the opposite cutting wheel to reduce deforming forces exerted on the end of the tube;
    wherein said at least one peripheral elastic member comprises an annular elastic element that is fastened to the front surface of the associated cutting wheel; and
    wherein the annular elastic element is clamped against the front surface of the associated cutting wheel by means of a clamping disc which is fastened to said front surface.

2. An assembly as claimed in claim 1, wherein each one of the cutting wheels has a peripheral elastic member which is disposed at the front surface of the cutting wheel and which has a peripheral surface configured to be engaged with the tube wall.

3. An assembly as claimed in claim 2, wherein each peripheral elastic member is offset radially inside the cutting edge of the associated cutting wheel.

4. A machine for producing tubes, comprising a tube cutting assembly as claimed in claim 3.

5. A machine for producing tubes, comprising a tube cutting assembly as claimed in claim 2.

6. An assembly as claimed in claim 1, wherein the clamping disc is fastened to said front surface by means of a central tightening screw which is coaxial with the rotational axis of the associated cutting wheel.

7. A machine for producing tubes, comprising a tube cutting assembly as claimed in claim 6.

8. An assembly as claimed in claim 1, wherein said at least one peripheral elastic member is made of polymer material.

9. A machine for producing tubes, comprising a tube cutting assembly as claimed in claim 8.

10. A machine for producing tubes, comprising a tube cutting assembly as claimed in claim 1.

11. An assembly for cutting a tube which is rotatable about a center axis and which has a tube wall, comprising:
    a first cutting wheel located inside the tube and rotatable about an axis of rotation parallel with the center axis of the tube, the first cutting wheel having a peripheral cutting edge and a peripheral tube supporting surface to be engaged with the tube wall;
    a second cutting wheel located outside the tubs and opposite the first cutting wheel, and rotatable about an axis of rotation parallel with the center axis of the tube, the second cutting wheel having a peripheral cutting edge and a peripheral tube supporting surface to be engaged with the tube wall; and
    means for bringing the cutting wheels into cutting engagement with the tube wall in a cutting direction perpendicular to the center axis of the tube for cutting through the tube wall at a cutting location;
    wherein at least one of the cutting wheels has a peripheral elastic member which is configured to be engaged with the tube wall at the cutting location and which is compressible in a direction parallel with the cutting direction towards the tube supporting surface of the opposite cutting wheel to reduce deforming forces exerted on the end of the tube;
    wherein said at least one peripheral elastic member is mounted in a peripheral recess of the associated cutting wheel; and
    wherein said at least one peripheral elastic member is an annular elastic element with a peripheral surface which is disposed radially outside the cutting edge of the associated cutting wheel.

12. An assembly as claimed in claim 11, wherein said at least one peripheral elastic member is clamped in the peripheral recess by means of a clamping disc.

13. A machine for producing tubes, comprising a tube cutting assembly as claimed in claim 12.

14. A machine for producing tubes, comprising a tube cutting assembly as claimed in claim 11.

15. An assembly as claimed in claim 11, wherein said at least one peripheral elastic member is made of polymer material.

16. A machine for producing tubes, comprising a tube cutting assembly as claimed in claim 15.

* * * * *